United States Patent [19]
Mahler

[11] Patent Number: 5,385,950
[45] Date of Patent: Jan. 31, 1995

[54] SEPARATION OF POLYMERS

[75] Inventor: Walter Mahler, Wilmington, Del.

[73] Assignee: E. I. Du Pont de Nemours and Company, Wilmington, Del.

[21] Appl. No.: 68,463

[22] Filed: May 27, 1993

[51] Int. Cl.$^6$ ............................................. B29B 17/00
[52] U.S. Cl. .................................. 521/45.5; 521/41; 521/46; 521/47
[58] Field of Search ..................... 521/45.5, 41, 47; 528/502; 526/46

[56] References Cited

U.S. PATENT DOCUMENTS 4,734,484  3/1988  Alfes et al. .................... 528/388

FOREIGN PATENT DOCUMENTS 54-3172  1/1979  Japan .
543172   1/1979  Japan .

Primary Examiner—Joseph L. Schofer
Assistant Examiner—Tom Weber

[57] ABSTRACT

A process for the separation of different polymers, by subjecting a molten polymer mixture containing two or more polymers to a gravity field greater than the Earth's gravity field. The process is useful in the recovery of scrap or waste polymers.

11 Claims, No Drawings

SEPARATION OF POLYMERS

FIELD OF THE INVENTION

Disclosed herein is a process for the separation of different polymers by subjecting molten mixtures of polymers to a high gravity field.

TECHNICAL BACKGROUND

The recycling (reuse) of polymers, particularly waste thermoplastics, is an important environmental objective. One major problem in recycling such materials is the need to separate different types of polymers from each other, since polymer mixtures do not lend themselves to recycling as well as relatively pure polymers. Various schemes have been tried for such separations, but none have been satisfactory from the point of view of cost and/or purity of the resultant polymers. Therefore improved methods to separate (waste) polymers are desired.

Japanese Patent Application 54-3172 describes a method for separating polymers by using liquids of various specific gravities to separate granular solid polymers. No mention is made of separating molten polymers in high gravity fields.

SUMMARY OF THE INVENTION

This invention concerns a process for separating different polymers, comprising, subjecting a molten mixture of two or more different uncrosslinked polymers to a gravity field greater than that of the Earth's gravity field.

DETAILS OF THE INVENTION

By different polymers herein is meant that the polymers have a different chemical composition. Differences in other structural factors such as molecular weight or end groups will not usually cause separations between two polymers. Polymers that may be separated from each other include polyolefins such as polyethylene, polystyrene, the block copolymer of polystyrene and polybutadiene, and polypropylene; nylons such as nylon 6, nylon 6, 6 and nylon 12; polyesters such as poly(ethylene terepthalate), poly(butylene terephthalate), poly(butylene terephthalate)-co-poly(tetramethyleneether), poly(hexamethylene adipate) and polyester of Bisphenol A and isophthalic acid; fluoropolymers such as poly[tetrafluoroethylene-co-perfluoro(propyl vinyl ether)], poly(vinyl fluoride), poly(vinylidene fluoride), and poly [tetrafluoroethylene-co-hexafluoropropylene); polycarbonates such as the polycarbonate of Bisphenol A; halogenated polymers such as poly(vinyl chloride) and poly(vinylidene chloride); polyethers such as poly(oxymethylene) and poly(ethylene oxide); and other polymers such as poly(ether ether ketones), poly(ether ketone ketones), poly(ether imides), and polysulfones.

The polymers to be separated herein are thermoplastics, that is, their glass transition temperature (Tg), and melting point (Tm), if the polymer is crystalline, are below the polymer's decomposition temperature, and the polymer is not significantly crosslinked. The polymers are molten during the separation, and that generally means the polymers will be above the highest Tg or Tm of the polymers in the mixture. An exception is that a polymer may be below its Tm if it supercools without crystallizing (many crystalline polymers do this). For most of the more common polymers, temperatures of between 150° and 350° C. are sufficiently high, often between 200° and 300° C. Polymers that may be melt processed will generally be separable by this process. Processing temperatures should be below the point at which significant decomposition of any of the polymers takes place.

After the molten polymers are separated they may be allowed to cool and solidify in the high gravity field, in which case the pure polymers are obtained as distinctly separate layers in a solid ingot. Generally speaking, these solidified layers do not stick strongly to an adjacent layer, and may be mechanically broken or sawed apart at the interface. The separated molten polymers may be separated from each other while molten, as in a continuous centrifuge type operation.

By a higher gravity field than that of the Earth is meant greater than the Earth's gravity at mean sea level, which is about 978 cm/sec$^2$. This unit is most conveniently expressed as a multiple of the Earth's gravity, herein abbreviated as "g" (the metric unit gram is abbreviated herein as "gm"), so that 10 times Earth's gravity would be 10 g (or about 9780 cm/sec$^2$). Higher than Earth gravity fields can be created by a centrifuge. Both continuous and batch centrifuges are well known to the artisan, and both may be used herein. In one preferred embodiment, the centrifuge is heated melt and maintain the polymer's molten state. See for instance W. Gerhartz, et al., Ed., Ullmann's Encyclopedia of Industrial Chemistry, 5th Ed., vol. B-2 VCH Velagsgesellshaft mbH, Weinheim, 1988, p. 11-1 to 11-27.

There is no theoretical upper limit on the strength of the gravity field employed, but this will usually be limited by the equipment available. The gravity field for the separation of the molten polymers is greater than 1 g, preferably about 2 g to 20,000 g, more preferably about 5 g to about 4,000 g, especially preferably about 10 g to about 3,000 g and most preferably about 200 g to about 2000 g. The time required to perform the separation will depend on the specific gravity differences between the various molten polymers, the strength of the gravitational field, the viscosity of those polymers, and the difference in their interfacial energy. In general, the greater the specific gravity difference, the greater the gravitational field, the lower the viscosity, and the greater their interfacial energy difference, the shorter the time that will be required. Separation times are typically a few minutes.

The method of separating polymers herein is particularly useful when separating a limited number of polymers, 5 or less, preferably 4 or less, more preferably 3 or less and most preferably 2. For instance, in the recycling of soda bottles which have 2 thermoplastics present, such as poly(ethylene terephthalate) for the bottle itself and polyethylene for the base, the instant method is particularly useful. When larger numbers of polymers are involved, several continuous centrifuging stages can be used to effect complete separation of all of the polymers.

A useful aspect of this separation of a pair of polymers is that when an unexpected third polymer is included, it will automatically be separated in the process, and can be easily seen. Dirt and debris will also be at least partially separated from the polymer(s).

EXAMPLE 1

Into a 22 mm id glass test tube was loaded 10 gm of polypropylene powder (isotactic, inherent viscosity 2.4)

and 8.5 gm nylon 6 pellets. The tube and contents were placed in an oven at 275° C. for one hour and then transferred to a centrifuge which was run at 3500 rpm (2000 g) for 20 minutes while the polymer mixture cooled. After centrifuging there was a sharp interface with the polypropylene on top and the nylon on the bottom. Repetition of this experiment showed that there was no separation of these two polymers after heating at 175° in earth's gravity alone (relative gravity=1) but there was separation at 125 g.

EXAMPLE 2

An empty soda bottle consisting of a clear poly(ethylene terephthalate) (PET) body and a yellow polyethylene (PE) support base was shredded and a 7 gm portion was placed in a 14 mm diameter glass tube. This was heated in an oven at 275° C. for one hour, then placed in a centrifuge and spun at 200 g for 20 minutes. After removing from the centrifuge there was obtained a cylinder of yellow PE on top of a cylinder of white PET with a sharp interface in between.

EXAMPLE 3

A soda bottle consisting of a clear body and black polyethylene base was shredded and 30 gm of this mixture was placed in a 24 mm diameter glass tube, This was heated in an oven at 290° C. for one hour and then placed in a centrifuge bucket and centrifuged at 1100 rpm (200 g) for 20 minutes, After centrifuging there was obtained a rod consisting of black PE on top and white PET on the bottom with a sharp interface.

EXAMPLE 4

A soda bottle consisting of a clear body and blue polyethylene base was shredded and 13 gm of this mixture was placed in a 24 mm diameter tube. This was heated in an oven at 290° C. and then centrifuged at 200 g for 5 minutes. An excellent separation of the components was obtained.

EXAMPLE 5

A sample of 16 gm of the shredded soda bottles described in Example 2, was combined with three shredded Styrofoam ® drinking cups (9 gm) in a 22 mm id glass tube. This was exposed to 290° C. and then centrifuged at 1100 rpm for 20 minutes (200 g) . There was obtained a rod consisting of a cylinder of PE on top, a cylinder of polystyrene in the middle and a cylinder of PET on the bottom with sharp interfaces. The rod could be easily broken apart at the interfaces.

EXAMPLE 6

Six grams of nylon 6 pellets were mixed with 3 gm of PET pellets in a 24 mm glass tube. The mixture was heated to 275° C. and then centrifuged at 500 g. The two polymers segregated from each other with a sharp interface.

EXAMPLE 7

Six grams of nylon 66 pellets were mixed with 3 gm of PET pellets, loaded into a 24 mm glass tube and heated at 290° C. and centrifuged at 200 g. After cooling in the centrifuge the components were separated with a sharp interface and were easily broken apart into two cylinders.

EXAMPLE 8

Eight grams each of polystyrene (PS) and nylon 6 pellets were loaded into 24 mm glass tubes, heated to 275° C. and centrifuged at 500 g. A good separation was obtained.

EXAMPLE 7

Six grams of polypropylene pellets were mixed with 3 gm of nylon 66 pellets in a 16 mm glass tube, heated at 290° C. and centrifuged at 150 g. The polymers were well separated with a sharp interface.

EXAMPLE 10

Six grams of high density polyethylene Mw 80,000, were mixed with 2 gm nylon 6 pellets, 4 gm polystyrene pellets 2 gm polyetheylene terephthalate strips (from a soda bottle) and 6 gm Teflon ® FEP strips. The mixture was heated to 325° C., then centrifuged at 2000 g. The resulting ingot was sliced lengthwise down the middle and revealed the five components in distinct layers.

EXAMPLE 11

Four grams PE (from a soda bottle) was mixed with 2 gm nylon 6 pellets, 4 gm PS pellets, 2 gm poly(ethylene terephthalate) strips from a shredded soda bottle, 4 gm of polytetrafluoroethylene-hexafluoropropylene copolymer and 2 gm poly(bisphenol-A-carbonate). The mixture was heated at 300° C. for one hour in an oven and then centrifuged at 4000 g for 30 minutes. After sawing the resulting ingot down the middle, the six components were observed to be well separated.

EXAMPLE 12

15 gm polystyrene pellets were mixed with 15 g polycarbonate (polybisphenol-A-carbonate) heated to 300° C. and centrifuged at 4000 g. The two components were separated with a sharp interface.

EXAMPLE 13

3.5 gm poly(methyl methacrylate) "V-920" pellets were mixed with 3.5 g polystyrene pellets in a 1.6 cm diameter glass tube, heated at 300° C. and centrifuged at 4000 g for 30 minutes in a centrifuge that was at room temperature. Only a modest separation was observed. The heating and centrifugation were repeated three times on the same sample and then the separation was very good.

EXAMPLE 14

The ingredients of Example 13 were loaded into a steel tube, heated to 300° C. and centrifuged at 16,000 g. A good separation of the components was obtained.

What is claimed is:

1. A process for separating different polymers, comprising, subjecting a molten mixture of two or more different uncrosslinked polymers to a gravity field greater than that of the Earth's gravity field.

2. The process as recited in claim 1 wherein said gravity field is about 2 g to about 20,000 g.

3. The process as recited in claim 1 wherein said. gravity field is about 25 g to about 2,000 g.

4. The process as recited in claim 1 wherein said polymers include polymers selected from the group consisting of polyolefins, nylons, polyesters, fluoropolymers, halogenated polymers, polyethers, poly(ether ether ketones), poly(ether ketone ketones), polycarbonates, poly(ether imides), and polysulfones.

5. The process as recited in claim 1 wherein said polymers include polymers selected from the group consisting of polyethylene, polystyrene, the block copolymer of polystyrene and polybutadiene, polypropylene, nylon 6, nylon 6,6, nylon 12, poly(ethylene terephthalate), poly(butylene terephthalate), poly(butylene terephthalate)-co-poly(tetramethyleneether), poly(hexamethylene adipate), the polyester of Bisphenol A and isophthalic acid, the polycarbonate of Bisphenol A, poly[tetrafluoroethylene-co-perfluoro(propyl vinyl ether)], poly(vinyl fluoride), poly(vinylidene fluoride), poly [tetrafluoroethylene-co-hexafluoropropylene), poly(vinyl chloride), and poly(vinylidene chloride).

6. The process as recited in claim 1 carried out at a temperature of about 150° C. to about 350° C.

7. The process as recited in claim 1 carried out at a temperature of about 200° C. to about 300° C.

8. The process as recited in claim 1 wherein said polymers are removed from contact with each other while in the molten state.

9. The process as recited in claim 1 wherein said polymers are removed from contact with each other while in the solid state.

10. The process as recited in claim 1 carried out in a centrifuge.

11. The process as recited in claim 10 wherein the centrifuge is heated.

* * * * *